United States Patent
Zhou et al.

(10) Patent No.: US 11,345,822 B2
(45) Date of Patent: May 31, 2022

(54) POWDER COATING COMPOSITION COMPRISING AN ORGANOMETALLIC CATALYST

(71) Applicant: PPG Industries Ohio, Inc., Cleveland, OH (US)

(72) Inventors: Hongying Zhou, Allison Park, PA (US); Daniel K. Dei, Pittsburgh, PA (US); Edward R. Millero, Jr., Gibsonia, PA (US); Kathryn A. Shaffer, Husdon, OH (US); Brian E. Woodworth, Glenshaw, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 71 days.

(21) Appl. No.: 16/807,462

(22) Filed: Mar. 3, 2020

(65) Prior Publication Data
US 2021/0277254 A1    Sep. 9, 2021

(51) Int. Cl.
| | | |
|---|---|---|
| *C09D 5/03* | (2006.01) |
| *B05D 1/06* | (2006.01) |
| *B05D 3/02* | (2006.01) |
| *B05D 7/14* | (2006.01) |
| *C08L 67/00* | (2006.01) |
| *C09D 167/00* | (2006.01) |

(52) U.S. Cl.
CPC ............... *C09D 5/033* (2013.01); *B05D 1/06* (2013.01); *B05D 3/0272* (2013.01); *B05D 7/14* (2013.01); *C08L 67/00* (2013.01); *C09D 167/00* (2013.01)

(58) Field of Classification Search
CPC ............... C09D 167/00; C09D 167/02; C09D 167/025; C09D 167/03; C09D 167/04; C09D 167/06; C09D 167/07; C09D 167/08; C09D 169/00; C09D 169/005; C09D 163/00; C09D 163/04; C09D 163/06; C09D 163/08; C09D 163/10; C09D 175/00; C09D 175/02; C09D 175/04; C09D 175/06; C09D 175/08; C09D 175/10; C09D 175/12; C09D 175/14; C09D 175/16; C09D 183/00; C09D 183/04; C09D 183/06; C09D 183/08; C09D 183/10; C09D 183/12; C09D 183/14; C09D 183/16; C09D 201/00; C09D 201/005; C09D 201/02; C09D 201/06; C09D 5/033
See application file for complete search history.

(56) References Cited

U.S. PATENT DOCUMENTS

| | | | |
|---|---|---|---|
| 4,366,288 A | | 12/1982 | Resz et al. |
| 5,208,291 A | * | 5/1993 | Wamprecht ........ C08G 18/8077 525/124 |
| 6,111,017 A | | 8/2000 | Imashiro et al. |
| 9,957,394 B2 | | 5/2018 | Zhou et al. |
| 2010/0179273 A1 | | 7/2010 | Spyrou et al. |
| 2015/0103529 A1 | | 4/2015 | Cai et al. |
| 2018/0371263 A1 | | 12/2018 | Pavlovich et al. |
| 2018/0371287 A1 | | 12/2018 | Poole et al. |
| 2019/0023940 A1 | | 1/2019 | Chasser et al. |

FOREIGN PATENT DOCUMENTS

| | | | |
|---|---|---|---|
| EP | 0798322 A1 | | 10/1997 |
| JP | 10316893 A | * | 12/1998 |
| JP | 10316893 A | | 12/1998 |
| JP | 11222563 A | * | 8/1999 |
| JP | 2002275255 A | * | 9/2002 |
| JP | 2008156517 A | | 7/2008 |
| WO | 2016084758 A1 | | 6/2016 |

OTHER PUBLICATIONS

JP2002275255 English Machine Translation, prepared Sep. 30, 2021. (Year: 2021).*
JP-10316893 English Machine Translation, prepared Sep. 30, 2021. (Year: 2021).*
JP-11222563 English Machine Translation, prepared Sep. 30, 2021. (Year: 2021).*

* cited by examiner

*Primary Examiner* — Christopher M Rodd
(74) *Attorney, Agent, or Firm* — Lucas P. Spano

(57) ABSTRACT

The present invention is directed to a powder coating composition including a hydroxy-functional polymer, a carbodiimide crosslinker, and an organometallic catalyst. The present invention is also directed to a substrate at least partially coated with the powder coating composition. The present invention is also directed to a method of applying a coating composition to a substrate including: applying the powder coating composition to a substrate and heating the powder coating composition to form a coating over the substrate.

20 Claims, No Drawings

POWDER COATING COMPOSITION COMPRISING AN ORGANOMETALLIC CATALYST

FIELD OF THE INVENTION

The present invention relates to a powder coating composition, a substrate at least partially coated with a coating formed from the same, and a method of applying the same to a substrate.

BACKGROUND OF THE INVENTION

Powder coating compositions including hydroxy-functional polymers may be cross-linked using blocked isocyanates which exhibit a deblocking temperature below 200° C. However, these deblocking groups may cause surface defects in the coatings or safety issues in the plant. Moreover, it is desirable that the gel times associated with these powder coating compositions be low.

SUMMARY OF THE INVENTION

The present invention is directed to a powder coating composition including a hydroxy-functional polymer, a carbodiimide crosslinker, and an organometallic catalyst.

DESCRIPTION OF THE INVENTION

For the purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" crosslinker, "an" organometallic catalyst, and the like refer to one or more of any of these items. Also, as used herein, the term "polymer" is meant to refer to pre-polymers, oligomers, and both homopolymers and copolymers. The term "resin" is used interchangeably with "polymer".

As used herein, the transitional term "comprising" (and other comparable terms, e.g., "containing" and "including") is "open-ended" and open to the inclusion of unspecified matter. Although described in terms of "comprising", the terms "consisting essentially of" and "consisting of" are also within the scope of the invention.

A powder coating composition may include a solid mixture of a hydroxy-functional polymer, a carbodiimide crosslinker, and an organometallic catalyst. The hydroxy-functional polymer may react with the carbodiimide when the powder mixture including both is coalesced to form a film and above a crosslinking temperature. The organometallic catalyst may catalyze the reaction between the hydroxy-functional polymer and the carbodiimide. The organometallic catalyst may catalyze an addition reaction between the hydroxy-functional polymer and the carbodiimide.

The hydroxy-functional polymer may include a polyhydroxyl-functional polymer. The hydroxy-functional polymer may have a hydroxyl value of at least 10, such as at least 20, at least 25, at least 30, at least 40, at least 50, at least 60, or at least 70 mg KOH/g. The hydroxy-functional polymer may have a hydroxyl value of up to 150, such as up to 125, up to 120, up to 110, up to 100, or up to 90 mg KOH/g. The hydroxy-functional polymer may have a hydroxyl value of from 10-150, such as from 25-100, from 10-100, or from 20-100.

As reported herein, the hydroxyl number is the number of mg of KOH equivalent to the hydroxyl groups in 1 g of material. To determine the hydroxyl number, a sample (typically, 0.1 to 3 g) was weighed accurately into a conical flask and dissolved, using light heating and stirring as appropriate. 10 ml of a 9.1 vol % solution of acetic anhydride in pyridine (i.e. 40 ml acetic anhydride in 400 ml pyridine; acetylating solution) and 2 ml of the 1-methylimidazole catalyst were then added to the mixture. A flask ring was placed on the flask and an air condenser into the flask. The flask was gently swirled to solubilize the sample. The flask was placed into a water bath that is preheated to 55° C.±2° C. and reflux the flask for 10 minutes. After reflux, 20 ml of hydrolysis solution (made from 600 volume parts of dimethylformamide, 200 volume parts of pyridine, and 200 volume parts of distilled water) was added through the air condenser. The flask was swirled to mix, and the flask was allowed to stand at room temperature for 5 minutes to hydrolyse the excess acetic anhydride. After 5 minutes, 20 ml solvent (propylene glycol/tetrahydrofuran 20/80 in volume ratio) was added, and the solution was titrated potentiometrically with 0.5M methanolic potassium hydroxide (KOH). A blank sample was also run where the sample of polymer is omitted. The resulting hydroxyl number is expressed in units of mg KOH/g and is calculated using the following equation:

Hydroxyl number=$((V_2-V_1) \times$ molarity of KOH solution (M)$\times 56.1)$/weight of solid sample (g)

wherein $V_1$ is the titre of KOH solution (ml) of the polymer sample and $V_2$ is the titre of KOH solution (ml) of the blank sample.

The hydroxy-functional polymer may include a hydroxy-functional polyester, urethane, urea, acrylic, and/or some combination thereof. The hydroxy-functional polymer may include a hydroxy-functional polyester polymer. The hydroxy-functional polymer may include a polyester grafted acrylic polymer.

The hydroxy-functional polymer may be a thermoset polymer. By "thermoset polymer" it is meant a polymer having functional groups that are reactive with themselves and/or a crosslinking agent, and upon such reaction, the polymer forms irreversible covalent bonds ("sets"). Once cross-linked, a thermoset polymer will not melt upon the application of heat and is insoluble in solvents. By "thermoplastic polymer" it is meant to include polymers produced from components that are not covalently bonded and, as such, can undergo liquid flow upon heating and/or can be soluble in certain solvents. A thermoplastic polymer can be heated to become pliable or moldable and re-solidify upon cooling.

The carbodiimide crosslinker may be reactive with the hydroxy-functional polymer (e.g., hydroxyl groups thereon) so as to crosslink the hydroxy-functional polymer.

The coating composition may be substantially free (less than 0.5% by weight based on total solids of the coating composition) of a blocked isocyanate crosslinker or may be free (less than 0.1% or 0% by weight based on total solids of the coating composition) of a blocked isocyanate crosslinker. The coating composition may be substantially free (less than 0.5% by weight based on total solids of the coating composition) of a blocked isocyanate crosslinker having a deblocking temperature below 200° C. or may be free (less than 0.1% or 0% by weight based on total solids of the coating composition) of a blocked isocyanate crosslinker having a deblocking temperature below 200° C. As used herein, "deblocking temperature" refers to the temperature at which 25% of the original mass of the blocked isocyanate has been lost according to a thermogravimetric analysis performed according to ASTM E1131-08.

The carbodiimide crosslinker may also include a blocked isocyanate, but such a crosslinker may have a deblocking temperature over 200° C. As such, reacting the carbodiimide crosslinker with the hydroxyl-functional polymers at temperatures below the deblocking temperature, such as at or below 200° C., at or below 180° C., at or below 160° C., or at or below 140° C. results in the isocyanate groups being blocked so as not to participate in the crosslinking reaction.

The carbodiimide crosslinker may include a polycarbodiimide. As used herein, the term "polycarbodiimide" refers to a polymer containing two or more units having the structure: —N═C═N—. As will be appreciated, polycarbodiimides can generally be prepared by a condensation reaction of a polyisocyanate in the presence of a suitable catalyst to form a polycarbodiimide intermediate having terminal NCO-functionalities and by terminating and/or chain extending the polycarbodiimide intermediate by the addition of one or more active hydrogen-containing compounds, such as an amine and/or a hydroxy-containing compound, as will be more fully described below.

Suitable polyisocyanates for use in the foregoing condensation reaction, include, without limitation, aliphatic, including cycloaliphatic, polyisocyanates. Such polyisocyanates can contain, for example, from 2 to 4, such as 2 isocyanate groups per molecule. Examples of suitable aliphatic and cycloaliphatic diisocyanates are methylene-bis(4-cyclohexylisocyanate), isophorone diisocyanate, 1,4-cyclohexyl diisocyanate, 1,3-bis(isocyanatomethyl)cyclohexane, meta-tetramethylxylene diisocyanate ("TMXDI"), and/or a mixture thereof. Substituted polyisocyanates can also be used in which the substituents are at least one of nitro, chloro, alkoxy, and other groups that are not reactive with hydroxyl groups or active hydrogens and provided the substituents are not positioned to render the isocyanate group unreactive.

The polyisocyanate can be an NCO-containing adduct such as would be formed, for example, when an active hydrogen-containing compound is present before or during polycarbodiimide formation, as described below.

The foregoing polycarbodiimide polymers can be made by any of a variety of methods starting from a polycarbodiimide intermediate having terminal NCO-functionalities. Moreover, the polycarbodiimide polymers can be produced from a polycarbodiimide intermediate made with or without use of an active hydrogen-containing chain extender.

The active hydrogen-containing chain extender may be a spacer linking polyisocyanates together or linking isocyanate functional polycarbodiimides together, depending upon when the active hydrogen compound is added. For example, the chain extender can be added before, during, or after formation of the polycarbodiimide intermediate having terminal NCO-functionalities.

Any suitable compound containing active hydrogens may be used as the chain extender, if a chain extender is employed. The term "active hydrogen atoms" refers to hydrogens which, because of their position in the molecule, display activity according to the Zerewitinoff test. Accordingly, active hydrogens include hydrogen atoms attached to oxygen, nitrogen, or sulfur, and thus useful compounds will include those having at least two hydroxyl, thiol, primary amine, and/or secondary amine groups (in any combination). For example, the active hydrogen-containing chain extender may contain from 2 to 4 active hydrogens per molecule.

Examples of such compounds include alcohols, which include polyols, amines, which includes polyamines, aminoalcohols, and mercapto-terminated derivatives. The term "polyol" is meant to include low molecular weight materials having an average of two or more hydroxyl groups per molecule and excludes high molecular weight polyols including polyethoxy or polypropxy groups (e.g., polyethylene glycol). By "low molecular weight materials" it is meant compounds having molecular weights Mw ranging from 0 to 1000 g/mol, such as 10 to 500 g/mol or 20 to 300 g/mol or 30 to 200 g/mol, or 50 to 150 g/mol or any other combination of numbers within any of these ranges.

Suitable polyols include low molecular weight diols, triols and higher alcohols, and low molecular weight amide-containing polyols. The low molecular weight diols, triols and higher alcohols include cycloaliphatic polyols such as 1,2-cyclohexanediol and cyclohexane dimethanol, aliphatic polyols, particularly alkylene polyols containing from 2 to 18 carbon atoms. Examples include ethylene glycol, 1,4-butanediol, 1,6-hexanediol. Examples of triols and higher alcohols include trimethylol propane, glycerol and pentaerythritol. Such chain extended polycarbodiimides comprise urethane linkages.

As mentioned above, to prepare a polycarbodiimide, an isocyanate terminated polycarbodiimide intermediate may be first formed by condensation reaction of a polyisocyanate, which may or may not have been previously chain extended by the reaction of a polyisocyanate with an active-hydrogen containing chain extender of the type previously described. The polyisocyanate is condensed with the elimination of carbon dioxide to form the isocyanate terminated polycarbodiimide.

The condensation reaction may be conducted by taking the solution of a polyisocyanate and heating in the presence of suitable catalyst. Examples include 1-ethyl-3-phospholine, 1-ethyl-3-methyl-3-phospholine-1-oxide, 1-ethyl-3-methyl-3-phospholine-1-sulfide, 1-ethyl-3-methyl-phospholidine, 1-methylphospholen-1-oxide, 1-ethyl-3-methylphospholidine-1-oxide, 3-methyl-1-phenyl-3-phospholine-1-oxide and bicyclic terpene alkyl or hydrocarbyl aryl phosphine oxide or camphene phenyl phosphine oxide.

The resulting polycarbodiimide, which may or may not be chain extended, may have terminal isocyanate groups. The isocyanate terminated polycarbodiimide can then be further reacted or capped by reacting the terminal isocyanate groups with an active hydrogen-containing hydrophilic compound to impart hydrophilicity to the polycarbodiimide enabling it to be dispersed in water. Suitable active hydrogen-containing hydrophilic compounds include monofunctional active hydrogen containing hydrophilic compounds, such as any secondary amine functional compound. Suitable active hydrogen-containing hydrophilic compounds for capping the polycarbodiimide having terminal isocyanate functional groups include secondary amines containing 8 or more carbon atoms, including di-n-butylamine, diamylamine, dihexylamine, dioctylamine. As a result, the capped polycarbodiimide comprises urea linkages within terminal positions of the polycarbodiimide.

The various materials used to prepare the polycarbodiimide, which may be chain extended and/or capped, may be selected such that the resulting polycarbodiimide has a high $T_g$, that is, at least 50° C., such as in a range of from 50° C. to 100° C., such as in a range of from 55° C. to 70° C. For example, materials including cyclic polyisocyanate and/or cyclic polyol chain extenders can impart a high $T_g$ to the resulting polycarbodiimide. Glass transition temperature ("Tg"), as reported herein, was measured by differential scanning calorimetry according to ASTM D3418-15 and reports the midpoint temperature unless otherwise indicated. The polycarbodiimide may be solid at ambient temperature (20° C.-27° C.)

For example, the various materials used to prepare the polycarbodiimide, which may be chain extended and/or capped, may be selected such that the resulting polycarbodiimide has a low melt viscosity. For example, the melt viscosity of the polycarbodiimide, which may be chain extended and/or capped, is approximately 30 poise at 200° C. as referenced by ASTM D4287.

For example, the polycarbodiimide, which may be chain extended and/or capped, can comprise at least 30%, such as from 30 to 90%, such as from 35 to 60%, by weight cyclic groups based on weight of the polycarbodiimide, thus imparting suitable $T_g$ and/or melt viscosity to the polycarbodiimide. In addition, the use of secondary amines having at least 8 carbon atoms to cap the polycarbodiimide, can further impart suitable $T_g$ and/or melt viscosity to the polycarbodiimide.

The addition reaction between the hydroxy-functional polymer and the carbodiimide crosslinker may be catalyzed by an organometallic catalyst. As used herein, the term "organometallic" refers to a chemical compound containing at least one carbon atom and at least one metal atom in which the carbon atom is bonded directly to the metal atom, or the carbon atom (C) is directly bonded to a third atom (X), which third atom is directly bonded to the metal atom (M) (C-X-M), wherein the third atom includes a nitrogen atom, an oxygen atom, a phosphorous atom, or a sulfur atom.

The metal of the organometallic catalysts may include a 2+ metal, a 3+ metal, a 4+ metal, a 5+ metal, and/or some combination thereof. The metal of the organometallic catalyst may include a 2+ metal, a 4+ metal, and/or some combination thereof. The 2+ metal and/or the 4+ metal may include zinc, tin, or some combination thereof. The metal of the organometallic catalyst may include bismuth, tin, titanium, zinc, zirconium, and/or some combination thereof. As used herein "n+ metal" refers to the metal ion of the metal.

The organometallic catalysts may include dibutyltin dilaurate, zinc (II) octoate, a zinc carboxylate, zinc acetate, a bismuth carboxylate, tin (II) octoate, titanium (IV) butoxide, titanium (IV) isobutoxide, zirconium (IV) propoxide, and/or some combination thereof. The organometallic catalyst may include dibutyltin dilaurate, zinc (II) octoate, a zinc carboxylate, and/or some combination thereof.

The organometallic catalyst may include a Lewis acid. As used herein, the term "Lewis acid" refers to a chemical species that contains an empty orbital which is capable of accepting an electron pair from a Lewis base to form a Lewis adduct. A "Lewis base", refers to a chemical species that has a filled orbital containing an electron pair which is not involved in bonding but may form a dative bond with a Lewis acid to form a Lewis adduct.

The powder coating composition may further include a thermoplastic polymer. The thermoplastic polymer may include a thermoplastic polyester polymer. The thermoplastic polymer may include a thermoplastic acrylic polymer, a thermoplastic polyamide polymer, a thermoplastic polyolefin polymer, a vinyl polymer (e.g., polyvinyl chloride), a thermoplastic polyester polymer, or some combination thereof.

The coating composition may comprise from 30-70% by weight of the hydroxy-functional polymer, based on total solids, such as from 40-60% by weight, from 50-70% by weight, or from 30-50% by weight. The coating composition may comprise at least 30% by weight of the hydroxy-functional polymer, based on total solids, such as at least 40% by weight or at least 50% by weight. The coating composition may comprise up to 70% by weight of the hydroxy-functional polymer, based on total solids, such as up to 60% by weight or up to 50% by weight.

The coating composition may comprise from 10-50% by weight of the carbodiimide crosslinker, based on total solids, such as from 20-50% by weight, from 20-40% by weight, from 20-30% by weight, from 30-50% by weight, from 30-40% by weight, or from 10-30% by weight. The coating composition may comprise at least 10% by weight of the carbodiimide crosslinker, based on total solids, such as at least 20% by weight, at least 30% by weight, or at least 40% by weight. The coating composition may comprise up to 50% by weight of the carbodiimide crosslinker, based on total solids, such as up to 40% by weight, up to 30% by weight, or up to 20% by weight. The carbodiimide crosslinker may be included in the coating composition in an amount of 50-80% of the amount of the hydroxy-functional polymer by weight include in the coating composition, based on total solids, such as 60-70%.

The coating composition may comprise up to 2% by weight of the organometallic catalyst, based on total solids, such as up to 1% by weight, or up to 0.5% by weight. The coating composition may comprise from 0.1-2% by weight of the organometallic catalyst, based on total solids, such as from 0.1-1% by weight, from 0.1-0.5% by weight, from 0.5-2% by weight, or from 1-2% by weight.

The coating composition may comprise from 30-70% by weight of the thermoplastic polymer, based on total solids, such as from 40-60% by weight, from 50-70% by weight, or from 30-50% by weight. The coating composition may comprise at least 30% by weight of the thermoplastic polymer, based on total solids, such as at least 40% by weight or at least 50% by weight. The coating composition may comprise up to 70% by weight of the thermoplastic polymer, based on total solids, such as up to 60% by weight or up to 50% by weight.

The powder coating composition may include various other additives. Non-limiting examples of other additives that can be used with the coating composition of the present invention include: pigments, plasticizers, abrasion resistant particles, corrosion resistant particles, corrosion inhibiting additives, fillers including, but not limited to, clays, inorganic minerals, anti-oxidants, hindered amine light stabilizers, UV light absorbers and stabilizers, surfactants, flow and surface control agents, thixotropic agents, organic co-solvents, reactive diluents, catalysts, reaction inhibitors, and other customary auxiliaries.

The powder coating composition may gel at a temperature of from 130° C.-200° C. As used herein, "gel" refers to powder gel time as determined according to the test method described in ASTM D4217-07, which corresponds to the interval at which the coating powder transformed from a dry solid to a gel-like state. The powder coating composition may gel at a temperature at or below 200° C., such as at or below 190° C., such as at or below 180° C., such as at or below 170° C., such as at or below 160° C., such as at or below 150° C., such as at or below 140° C., or at or below 130° C. The powder coating composition may gel within at least one of these temperature ranges in a gel time of less than 5 minutes. The powder coating composition may gel within at least one of these temperature ranges at a gel time of less than the gel time of the same powder coating composition except not including the organometallic catalyst and/or not including any catalyst.

The powder coating composition, once prepared, may be applied to at least a portion of a substrate and cured to form a coating. Suitable application methods may include, but are not limited to, electrostatic spray coating and/or dip coating.

The applied powder coating composition may be heated to form a coating over the substrate. The applied powder coating composition may be heated to a temperature of up to 200° C., such as up to 190° C., up to 180° C., up to 170° C., up to 160° C., up to 150° C., up to 140° C., or up to 130° C. to form a coating over the substrate. The powder coating composition may gel in less than 5 minutes, such as less than 4 minutes, less than 3 minutes, less than 2 minutes, or less than 1 minute after the temperature is applied.

The powder coating composition may be applied to any substrates known in the art, for example, automotive substrates (and other substrates associated with a vehicle), marine substrates, industrial substrates (e.g., tools, heavy duty equipment, and the like), packaging substrates, lumber, wood flooring and furniture, apparel, appliances, electronics including housings and circuit boards and including consumer electronics such as housings for computers, notebooks, smartphones, tablets, televisions, gaming equipment, computer equipment, computer accessories, MP3 players, and the like, glass and transparencies, sports equipment including golf balls, and the like. These substrates can be, for example, metallic or non-metallic. Metallic substrates include tin, steel, tin-plated steel, chromium passivated steel, galvanized steel, aluminum, and aluminum foil. Metal sheet as used herein refers to flat metal sheet and coiled metal sheet, which is coiled, uncoiled for coating and then re-coiled for shipment to a manufacturer. Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) ("PET"), polycarbonate, polycarbonate acrylobutadiene styrene ("PC/ABS"), polyamide, wood, veneer, wood composite, particle board, medium density fiberboard, cement, stone, glass, paper, cardboard, textiles, leather both synthetic and natural, and the like. The substrate can be one that has been already treated in some manner, such as to impart visual and/or color effect. The substrate may be an indoor substrate or an outdoor substrate commonly subjected to outdoor environmental conditions. The powder coating composition may impart improved chemical resistance and durability compared to the bare substrate.

A package may be coated at least in part with any of the powder coating compositions described above. A "package" is anything used to contain another item, particularly for shipping from a point of manufacture to a consumer, and for subsequent storage by a consumer. A package will be therefore understood as something that is sealed so as to keep its contents free from deterioration until opened by a consumer. The manufacturer will often identify the length of time during which the food or beverage will be free from spoilage, which typically ranges from several months to years. Thus, the present "package" is distinguished from a storage package or bakeware in which a consumer might make and/or store food; such a package would only maintain the freshness or integrity of the food item for a relatively short period. "Package" as used herein means the complete package itself or any component thereof, such as an end, lid, cap, and the like. For example, a "package" coated with any of the powder coating compositions described herein might include a metal can in which only the can end or a portion thereof is coated. A package according to the present invention can be made of metal or non-metal, for example, plastic or laminate, and be in any form. An example of a suitable package is a laminate tube. Another example of a suitable package is metal can. The term "metal can" includes any type of metal can, package or any type of receptacle or portion thereof that is sealed by the food/beverage manufacturer to minimize or eliminate spoilage of the contents until such package is opened by the consumer. One example of a metal can is a food can; the term "food can(s)" is used herein to refer to cans, packages or any type of receptacle or portion thereof used to hold any type of food and/or beverage. "Beverage can" may also be used to refer more specifically to a food can in which a beverage is packaged. The term "metal can(s)" specifically includes food cans, including beverage cans, and also specifically includes "can ends" including "E-Z open ends", which are typically stamped from can end stock and used in conjunction with the packaging of food and beverages. The term "metal cans" also specifically includes metal caps and/or closures such as bottle caps, screw top caps and lids of any size, lug caps, and the like. The metal cans can be used to hold other items as well, including, but not limited to, personal care products, bug spray, spray paint, and any other compound suitable for packaging in an aerosol can. The cans can include "two piece cans" and "three-piece cans" as well as drawn and ironed one-piece cans; such one piece cans often find application with aerosol products. Packages coated according to the present invention can also include plastic bottles, plastic tubes, laminates and flexible packaging, such as those made from PE, PP, PET and the like. Such packaging could hold, for example, food, toothpaste, personal care products and the like.

The powder coating composition may be applied to the interior and/or the exterior of the package. For example, the coating can be applied onto metal used to make a two-piece food can, two-piece beverage can, a three-piece food can, can end stock and/or cap/closure stock. The coating can be applied to the "side stripe" of a metal can, which will be understood as the seam formed during fabrication of a three-piece can. The coating can also be applied to caps and/or closures; such application can include, for example, a protective varnish that is applied before and/or after formation of the cap/closure and/or a pigmented enamel post applied to the cap, particularly those having a scored seam at the bottom of the cap. Decorated can stock can also be partially coated externally with the coating described herein, and the decorated, coated can stock used to form various metal cans. The coating can be applied to can stock before formation of the can or can part, or can be applied to the can or can part after formation.

Any material used for the formation of food cans can be treated according to the present methods. Particularly suitable substrates include aluminum, tin-plated steel, tin-free steel, and black-plated steel.

The present invention therefore further includes a method of coating a package comprising applying to at least a portion of the package any of the powder coating compositions described above, and curing the coating. Two-piece cans are manufactured by joining a can body (typically a drawn metal body) with a can end (typically a drawn metal end). The coatings of the present invention are suitable for use in food contact situations and may be used on the inside of such cans. They are particularly suitable to be spray applied on the interior of two-piece drawn and ironed beverage cans and coil coatings for food can ends. The present invention also offers utility in other applications. These additional applications include, but are not limited to, wash coating, sheet coating, and side seam coatings (e.g., food can side seam coatings).

Spray coating includes the introduction of the powder coating composition into the inside of a preformed package. Typical preformed packages suitable for spray coating include food cans, beer and beverage packages, and the like. The spray may utilize a spray nozzle capable of uniformly coating the inside of the preformed package. The sprayed preformed package is then subjected to heat to remove the residual solvents and harden the coating. For food inside spray, the curing conditions involve maintaining the temperature measured at the can dome at 350 to 500° F. (177 to 260° C.) for 0.5 to 30 minutes.

A sheet coating is described as the coating of separate pieces of a variety of materials (e.g., steel or aluminum) that have been pre-cut into square or rectangular "sheets." Typical dimensions of these sheets are approximately one square meter. Once coated, each sheet is cured. Once hardened (e.g., dried and cured), the sheets of the coated substrate are collected and prepared for subsequent fabrication. Sheet coatings provide coated metal (e.g., steel or aluminum) substrate that can be successfully fabricated into formed articles, such as 2-piece drawn food cans, 3-piece food cans, food can ends, drawn and ironed cans and the like.

A side seam coating is described as the spray application of a coating over the welded area of formed three-piece food cans. When three-piece food cans are being prepared, a rectangular piece of coated substrate is formed into a cylinder. The formation of the cylinder is rendered permanent due to the welding of each side of the rectangle via thermal welding. Once welded, each can typically require a layer of coating, which protects the exposed "weld" from subsequent corrosion or other effects to the contained foodstuff. The coatings that function in this role are termed "side seam stripes". Typical side seam stripes are spray applied and cured quickly via residual heat from the welding operation in addition to a thermal, infrared, and/or electromagnetic oven.

The present invention further includes the subject matter of the following clauses:

Clause 1: A powder coating composition, comprising: a hydroxy-functional polymer; a carbodiimide crosslinker; and an organometallic catalyst.

Clause 2: The powder coating composition of clause 1, wherein the organometallic catalyst comprises bismuth, tin, titanium, zinc, and/or zirconium.

Clause 3: The powder coating composition of clause 1 or 2, wherein the organometallic catalyst comprises a 2+ metal, a 3+ metal, a 4+ metal, and/or a 5+ metal.

Clause 4: The powder coating composition of clause 3, wherein the organometallic catalyst comprises a 2+ metal and/or 4+ metal, wherein the 2+ metal and/or 4+ metal comprises zinc and/or tin.

Clause 5: The powder coating composition of any of clauses 1-4, wherein the organometallic catalyst comprises dibutyltin dilaurate, zinc (II) octoate, and/or a zinc carboxylate.

Clause 6: The powder coating composition of any of clauses 1-5, wherein the powder coating composition gels at a temperature of from 130° C. to 200° C.

Clause 7: The powder coating composition of any of clauses 1-6, wherein the powder coating composition has a gel time at a temperature less than a gel time of the same powder coating composition not including the organometallic catalyst at the same temperature.

Clause 8: The powder coating composition of any of clauses 1-7, wherein the powder coating composition has a gel time of less than 5 minutes at 180° C.

Clause 9: The powder coating composition of any of clauses 1-8, wherein the hydroxy-functional polymer has a hydroxyl value of at least 10.

Clause 10: The powder coating composition of any of clauses 1-9, wherein the organometallic catalyst comprises a Lewis acid.

Clause 11: The powder coating composition of any of clauses 1-10, wherein the powder coating composition is free of blocked isocyanate having a deblocking temperature below 200° C.

Clause 12: The powder coating composition of any of clauses 1-11, wherein the hydroxy-functional polymer comprises a hydroxy-functional polyester.

Clause 13: The powder coating composition of any of clauses 1-12, further comprising a thermoplastic polymer.

Clause 14: A substrate at least partially coated with a coating formed from the powder coating composition of any of clauses 1-13.

Clause 15: The substrate of clause 14, wherein the substrate comprises metal.

Clause 16: The substrate of clause 14 or 15, wherein the substrate comprises an automotive component, an industrial component, an appliance, and/or a package.

Clause 17: A method of applying a coating composition to a substrate, comprising: applying the powder coating composition of any of clauses 1-13 to a substrate; and heating the powder coating composition to form a coating over the substrate.

Clause 18: The method of clause 17, wherein heating the powder coating composition, comprises: heating the applied powder coating composition to a temperature of up to 200° C. to cause the powder coating composition to gel in a time of less than 5 minutes.

Clause 19: The method of clause 17 or 18, wherein the powder coating composition gels at a temperature of from 130° C. to 200° C.

Clause 20: The method of any of clauses 17-19, wherein the organometallic catalyst comprises bismuth, tin, titanium, zinc, and/or zirconium.

Clause 21: The method of any of clauses 17-20, wherein the powder coating composition is free of blocked isocyanate capable of deblocking at a temperature below 200° C.

EXAMPLES

Example 1

Preparation of Powder Polycarbodiimide

A powder Polycarbodiimide was formed using the components in Table 1.

TABLE 1

| Components | Parts by weight |
|---|---|
| Charge #1 | |
| IPDI[1] | 666.0 |
| Phospholene oxide[2] | 5.0 |
| Charge #2 | |
| Methyl isobutyl ketone (MIBK) | 300 |
| Charge #3 | |
| Dibutyltin dilaurate[3] | 0.03 |
| Charge #4 | |
| 1,6-hexanediol[4] | 55.0 |
| Charge #5 | |
| Di-n-butylamine[5] | 117.9 |

[1]Isophorone diisocyanate commercially available from Covestro AG (Leverkusen, Germany)
[2]1-methyl-1-oxo-phospholene commercially available from Clariant AG (Muttenz, Switzerland)
[3]Commercially available from Air Products & Chemicals (Allentown, PA)
[4]Commercially available from BASF (Ludwigshafen, Germany)
[5]Commercially available from BASF (Ludwigshafen, Germany)

666.0 g of IPDI and 5.0 g of 1-Methyl-1-Oxo-Phospholene were added to a 2-liter, 4-necked kettle equipped with a motor driven stainless steel stir blade, a water-cooled condenser, a nitrogen sparge, and a heating mantle with a thermometer connected through a temperature feedback control device. The contents of the flask were heated to 160° C. and held for 4 hours until the NCO equivalent weight was 318 (determined using a Metrohm 888 Titrando; titration by dissolving a sample (~2.00 g) of the mixture in 30 mL of a solution comprised of 20 mL of dibutylamine and 980 mL of either n-methyl pyrrolidone, followed by titration with 0.2 N HCl solution in isopropanol titration agent). The reaction mixture was cooled to 100° C. and 300 g of MIBK and of 0.03 g of liquid dibutyltin dilaurate were added. At 100° C., 55.0 g of 1,6-hexanediol was added over 20 minutes and the reaction mixture was held at 90-100° C. until the NCO equivalent weight stalled at about 1017. 117.9 g of Di-n-butylamine was added and the mixture was held at 90-100° C. until IR spectroscopy showed the absence of the characteristic NCO band. After completion of the reaction, the reaction mixture was concentrated by evaporation under vacuum to remove solvent. The residual liquid was poured out onto aluminum foil and formed a solid at room temperature. The solid was grinded into fine powder (100 μm).

The weight average molecular weight was 4574 g/mol as determined by gel permeation chromatography (GPC). GPC was performed using a Waters 2695 separation module with a Waters 410 differential refractometer (RI detector) and polystyrene standards. The molecular weight (Mw or Mn) values reported herein were determined using this method. Tetrahydrofuran (THF) was used as the eluent at a flow rate of 1 mL min$^{-1}$, and two PL Gel Mixed C columns were used for separation Examples 2-4

Preparation of a Polyester Powder Coating Composition

Powder coating compositions were prepared by mixing the components listed in Table 2 in a strand mill. The weights listed in Table 2 are provided in grams. The mixture was passed through a 19 mm twin-screw extruder utilizing a four-zone temperature profile with zone 1 temperature set to 80° C.; and zones 2 through 4 temperatures set to 100° C. The extrudate was directly cooled on chill rollers. The brittle was then pulverized in a strand mill, ground in an air classifier, and passed through a 100 mesh sieve to obtain a powder with an average particle size of 28 μm, as measured using a Beckman-Coulter LS 12 320 Laser Diffraction Particle Size Analyzer.

TABLE 2

| Component | Example 2 (Control) | Example 3 | Example 4 (Comparative) |
|---|---|---|---|
| URALAC P1580[6] | 294 | 294 | 294 |
| Carbodiimide of Example 1 | 185 | 185 | — |
| VESTAGON B1530[7] | — | — | 125 |
| BUTAFLOW BT-71[8] | — | 2 | 2 |
| RESIFLOW PL-200A[9] | 2 | 2 | 2 |
| Benzoin[10] | 4 | 4 | 4 |
| PORTAFIL A 40[11] | 168 | 168 | 168 |
| MONARCH 1300[12] | 6 | 6 | 6 |

[6]Hydroxy functional polyester resin commercially available from DSM (Heerlen, Netherlands)
[7]Polyisocyanate adduct commercially available from Evonik Industries (Essen, Germany)
[8]Tin-based catalyst commercially available from Estron Chemical, Inc. (Calvert City, KY)
[9]Flow additive commercially available from Estron Chemical, Inc. (Calvert City, KY)
[10]Degassing additive commercially available from Estron Chemical, Inc. (Calvert City, KY)
[11]Aluminum hydroxide commercially available from Sibelco (Antwerp, Belgium)
[12]Black pigment commercially available from Cabot Corporation (Boston, MA)

The powder coating compositions of Examples 2-4 were applied to aluminum or phosphate carbon steel substrates using a Nordson electrostatic spray gun with a slot or conical tip. The coated panels were cured in an electric or gas oven for 15 min at 375° F. (191° C.) to a dry film thickness of approximately 2.0-3.0 mils (50-76 μm).

The powder coating compositions and resulting coatings were tested for various properties. The following properties and methods of determining the properties are described below.

Impact Resistance: direct- and/or reverse-impact resistance of the coatings on steel substrates were measured following ASTM standard D2794-93 using a Gardner impact tester. Impact resistance values reported as inch-pounds (In.lb) were recorded at the highest level of impact at which no film removal or cracking was observed.

MEK Double Rubs: the extent of cure of each powder coating was assessed by investigating coating chemical resistance. A cotton ball soaked in methyl ethyl ketone (MEK) was rubbed back-and-forth over the coated substrate, and the number of MEK double rubs required to break through or mar the coating was recorded (up to 50 double rubs or up to 100 double rubs).

Crosshatch Adhesion: Adhesion testing is performed to assess whether the coating adheres to the substrate. The adhesion test is performed according to ASTM D3359 Test Method B, using Scotch 610 tape, available from 3M Company of (Saint Paul, Minn.). The rating scale is from 0B to 5B with 5B indicating no adhesion loss while 0B indicates greater than 65% adhesion loss.

Powder Gel Time: The gel time was determined according to the test method described in ASTM D4217-07. The interval at which the coating powder transformed from a dry solid to a gel-like state was measured at 180° C. on a polished hot surface. Measurement of the gel times assures that the powder coating will fully cure as a continuous film when applied.

Results of the powder and film attributes are listed in Table 3. The gel time from Example 3 was an improvement over Comparative Example 4 using blocked isocyanate. The crosshatch adhesion, MEK double rubs, and direct/reverse impact were comparable to Comparative Example 4 using blocked isocyanate.

TABLE 3

| Measured Property | Example 2 (Control) | Example 3 | Example 4 (Comparative) |
|---|---|---|---|
| Gel Time at 180° C. (min:sec) | 5:15 | 0:40 | 1:45 |
| Crosshatch Adhesion | 5B | 5B | 5B |
| 50 MEK Double Rubs | pass | pass | pass |
| Impact Direct/Reverse (In · lbs) | 30/0 | 160/120 | 160/140 |

The coatings formed from Examples 2-4 were also evaluated for corrosion resistance. The corrosion performance was evaluated by salt spray resistance according to ASTM B117-18. Scribed coatings were prepared on BONDERITE 1000 steel panels and exposed to 5% salt fog at 35° C. and a 100% relative humidity chamber. Panels were inspected at 500 hour intervals. The results of the corrosion testing is listed in Table 4.

TABLE 4

| Scribe Creep (mm) | Example 2 (Control) | Example 3 | Example 4 (Comparative) |
|---|---|---|---|
| 500 hours | 3.8 | 2.2 | 2.2 |
| 1000 hours | 10.1 | 3.8 | 3.6 |
| 1500 hours | 10.1 | 4.1 | 4.8 |

As shown in Table 4, the corrosion resistance of the carbodiimide, to the minimum, matched the Comparative Example 4, which used blocked isocyanate.

Example 5

Further Catalyst Evaluation

Various catalysts were tested by reacting the carbodiimide of Example 1 and URALAC P1580 in the presence of the catalysts, using the same amounts of resin, catalyst, and crosslinker from Example 3 shown in Table 2. The additives from Table 3 were not included in the evaluated composition. Table 5 shows the gel time at 180° C. for each catalyst. Certain of the catalysts improved the gel time of the coating composition compared to the uncatalyzed reaction, and certain gel times at 180° C. were even shorter than 5 minutes.

TABLE 5

| Catalyst | Gel Time at 180° C. |
|---|---|
| No catalyst (Control) | 5:15 |
| Dibutyltin diluarate[8] | 0:30 |
| Zinc (II) octoate[13] | 0:15 |
| K-KAT XK-605[14] | 0:20 |
| NACURE XC-2001[15] | 0:15 |
| K-KAT XK-640[16] | 3:15 |
| Bismuth methanesulfonate (MSA) 6.2% in acid[17] (Comparative) | 6:45 |
| Bismuth (III) nitrate[18] (Comparative) | 6:50 |
| Titanium (TiO$_2$)[19] (Comparative) | 6:05 |
| TiO$_2$ solution pure liquid[20] (Comparative) | 5:40 |
| Titanium (IV) butoxide 97 wt % in 1-propanol[21] | 3:10 |
| Titanium (IV) isobutoxide 97%[22] | 4:30 |
| Zirconium (IV) propoxide 70 wt % in 1-propanol[23] | 4:50 |
| Zinc oxide[24] (Comparative) | 5:20 |
| Zinc acetate[25] | 2:30 |
| Tin (II) octoate [26] | 4:20 |

[13]Commercially available from Sigma-Aldrich (St. Louis, MO)
[14]A zinc carboxylate-containing catalyst, commercially available from King Industries, Inc. (Norwalk, CT)
[15]A zinc carboxylate-containing catalyst, commercially available from King Industries, Inc. (Norwalk, CT)
[16]A bismuth carboxylate-containing catalyst, commercially available from King Industries, Inc. (Norwalk, CT)
[17]Commercially available from Reaxis Inc. (McDonald, PA)
[18]Commercially available from Sigma-Aldrich (St. Louis, MO)
[19]Commercially available from Sigma-Aldrich (St. Louis, MO)
[20]Commercially available from Sigma-Aldrich (St. Louis, MO)
[21]Commercially available from Sigma-Aldrich (St. Louis, MO)
[22]Commercially available from Sigma-Aldrich (St. Louis, MO)
[23]Commercially available from Sigma-Aldrich (St. Louis, MO)
[24]Commercially available from Fisher Scientific (Waltham, MA)
[25]Commercially available from Sigma-Aldrich (St. Louis, MO)
[26]Commercially available from Sigma-Aldrich (St. Louis, MO)

Certain of the catalysts with the fastest gel times at 180° C. were further tested for gel time at lower temperatures, which results are shown in Table 6.

TABLE 6

| Catalyst | Gel Time at 180° C. | Gel Time at 160° C. | Gel Time at 140° C. |
|---|---|---|---|
| Dibutyltin diluarate[8] | 0:30 | 0:35 | 1:45 |
| Zinc (II) octoate[13] | 0:15 | 0:25 | 1:20 |
| K-KAT XK-605[14] | 0:20 | 0:50 | 2:20 |
| NACURE XC-2001[15] | 0:15 | 0:15 | 0:30 |

Example 6

Preparation of Powder Polycarbodiimide 333.0 g of IPDI and 2.5 g of 1-Methyl-1-Oxo-Phospholene were added to a 1-liter, 4-necked kettle equipped with a motor driven stainless steel stir blade, a water-cooled condenser, a nitrogen sparge, and a heating mantle with a thermometer connected through a temperature feedback control device. The contents of flask were heated to 160° C. and held for 4 hours until the NCO equivalent weight was 312.8. The reaction mixture was cooled to 100° C. and 151.4 g of MIBK was added and the reaction mixture was held at 90-100° C. until the NCO equivalent weight was 507. 63.0 g of di-n-butylamine was added dropwise and the mixture was held at 90-100° C. until IR spectroscopy showed the absence of the characteristic NCO band. After completion of the reaction, the reaction mixture was concentrated by evaporation under vacuum to remove solvent. The residual liquid was poured out onto aluminum foil and formed a solid at room temperature. The solid was grinded into fine powder (100 μm). The weight average molecular weight was 1679 g/mol.

Examples 7 and 8

Preparation of a Polyester Powder Coating Composition Including a Thermoplastic Polymer Powder coating compositions were prepared by mixing the components listed in Table 7.

TABLE 7

| Component | Example 7 (Comparative) | Example 8 |
|---|---|---|
| PES 3521[16] | 45.6 | 45.4 |
| CRYLCOAT 2890-0[17] | 45.0 | 45.0 |
| Carbodiimide of Example 6 | 6.4 | 6.4 |
| Titanium Dioxide[18] | 25.0 | 25.0 |
| Blanc Fixe Micro[19] | 15.0 | 15.0 |
| BYK-3900P[20] | 1.0 | 1.0 |
| BYK-3950P[21] | 1.0 | 1.0 |
| CERAFLOUR 961[22] | 1.0 | 1.0 |
| K-KAT XK-672[23] | — | 1.2 |

[16]Thermoplast Polyester commercially available from Fixatti (Wallisellen, Switzerland)
[17]Hydroxyl functional polyester resin commercially available from Allnex (Frankfurt am Main, Germany)
[18]TIOXIDE TR-93 commercially available from Huntsman Corporation (The Woodlands, TX)
[19]Barium sulfate commercially available from Sachtleben Chemie (Duisburg, Germany)
[20]Anti-cratering additive commercially available from BYK Additives and Instruments (Wesel, Germany)
[21]Leveling additive commercially available from BYK Additives and Instruments (Wesel, Germany)
[22]Degassing additive commercially available from BYK Additives and Instruments (Wesel, Germany)
[23]Zinc organometallic catalyst commercially available from King Industries, Inc. (Norwalk, CT)

Examples 7 and 8 were prepared using the components and amounts (parts by weight in grams) shown in Table 7. The coating compositions were prepared by premixing the ingredients in a three-blade mixer rotating at 3500 rpm. The premix was then extruded in a 19 mm dual screw extruder operating at a temperature of 110° C. The extrudate was rapidly cooled and pressed into chip. The addition of 0.3% AEROSIL 200 from Evonik Industries (Essen, Germany) was added to the chip prior to milling. The chip was micronized to a mean particle size of 30 to 50 μm using a Mikro ACM-1 Air Classifying Mill (ACM).

The powder coating compositions were electrostatically sprayed on electrolytic tinplate steel using a Nordson Versa Spray II electrostatic sprayer. The powder coating compositions were applied at a thickness of 50 to 75 μm. The powder coated panels were heated in a one-zone, gas-fired, conveyor oven for 10 seconds to obtain a peak metal temperature of 280° C.

The powder coating compositions and resulting coatings were tested for various properties. The following properties and methods of determining the properties are described below.

MEK Test: The MEK double rub test rub uses a gauze covered hammer that is saturated with methyl ethyl ketone. The coatings were evaluated for the number of double rubs it took to soften and break through the coating or reached 100 double rubs.

Crosshatch Adhesion: Crosshatch adhesion was tested as described above in connection with Examples 2-4.

Wedge Bend Test: The wedge bend test involves bending a coated test specimen over a 0.32 centimeter mandrel to form a test wedge. The test wedge is then impacted along the deformation axis with a 1.8 kilogram weight dropped from a height of 25.4 centimeters. The millimeters of coating failure or cracking along the deformation axis of the test wedge is reported.

Reverse Impact Test: Resistance to cracking caused by direct impact was measured in accordance with ASTM D2794-93.

Deionized Water Retort Test: The "DI Water Retort" test is designed to measure the resistance of a coating to deionized water. Coated strips are immersed into the deionized water and placed in a steam autoclave for 30 minutes at 121° C. and 15 psi. The strips are then cooled in deionized water, dried, and immediately rated for adhesion as previously described.

TABLE 8

| Measured Property | Example 7 (Comparative) | Example 8 |
|---|---|---|
| MEK Test | 100 | 100 |
| Crosshatch Adhesion | 5B | 5B |
| Wedge Bend Test (mm failure) | 79 | 40 |
| Reverse Impact (20 in-lb force) | Cracking | No Crack |
| Deionized Water Retort Adhesion | 0B | 4B |

Table 8 shows that the addition of the organometallic catalyst to the powder coating formulation improved flexibility illustrated by improvements in wedge bends and reverse impact tests. Water retort adhesion was also improved with the organometallic catalyst. Adhesion was improved from 0B to 4B (less than 5% adhesion loss).

Whereas particular embodiments of this invention have been described above for purposes of illustration, it will be evident to those skilled in the art that numerous variations of the details of the present invention may be made without departing from the invention as defined in the appended claims.

The invention claimed is:

1. A powder coating composition, comprising:
   a hydroxy-functional polymer;
   a carbodiimide crosslinker; and
   an organometallic catalyst;
   wherein the powder coating composition is substantially free of blocked isocyanate having a deblocking temperature below 200° C.

2. The powder coating composition of claim 1, wherein the organometallic catalyst comprises bismuth, tin, titanium, zinc, and/or zirconium.

3. The powder coating composition of claim 1, wherein the organometallic catalyst comprises a 2+ metal, a 3+ metal, a 4+ metal, and/or a 5+ metal.

4. The powder coating composition of claim 3, wherein the organometallic catalyst comprises a 2+ metal and/or 4+ metal, wherein the 2+ metal and/or 4+ metal comprises zinc and/or tin.

5. The powder coating composition of claim 1, wherein the organometallic catalyst comprises dibutyltin dilaurate, zinc (II) octoate, and/or a zinc carboxylate.

6. The powder coating composition of claim 1, wherein the powder coating composition gels at a temperature of from 130° C. to 200° C.

7. The powder coating composition of claim 1, wherein the powder coating composition has a gel time at a temperature less than a gel time of the same powder coating composition not including the organometallic catalyst at the same temperature.

8. The powder coating composition of claim 1, wherein the powder coating composition has a gel time of less than 5 minutes at 180° C.

9. The powder coating composition of claim 1, wherein the hydroxy-functional polymer has a hydroxyl value of at least 10.

10. The powder coating composition of claim 1, wherein the organometallic catalyst comprises a Lewis acid.

11. The powder coating composition of claim 1, wherein the powder coating composition is free of blocked isocyanate having a deblocking temperature below 200° C.

12. The powder coating composition of claim 1, wherein the hydroxy-functional polymer comprises a hydroxy-functional polyester.

13. The powder coating composition of claim 1, further comprising a thermoplastic polymer.

14. A substrate at least partially coated with a coating formed from the powder coating composition of claim 1.

15. The substrate of claim 14, wherein the substrate comprises metal.

16. The substrate of claim 14, wherein the substrate comprises an automotive component, an industrial component, an appliance, and/or a package.

17. A method of applying a coating composition to a substrate, comprising:
    applying the powder coating composition of claim 1 to a substrate; and
    heating the powder coating composition to form a coating over the substrate.

18. The method of claim 17, wherein heating the powder coating composition, comprises:
    heating the applied powder coating composition to a temperature of up to 200° C. to cause the powder coating composition to gel in a time of less than 5 minutes.

19. The method of claim 17, wherein the powder coating composition gels at a temperature of from 130° C. to 200° C.

20. The method of claim 17, wherein the organometallic catalyst comprises bismuth, tin, titanium, zinc, and/or zirconium.

* * * * *